T. WEAVER.
JOURNALS AND COUPLINGS.
No. 177,181. Patented May 9, 1876.
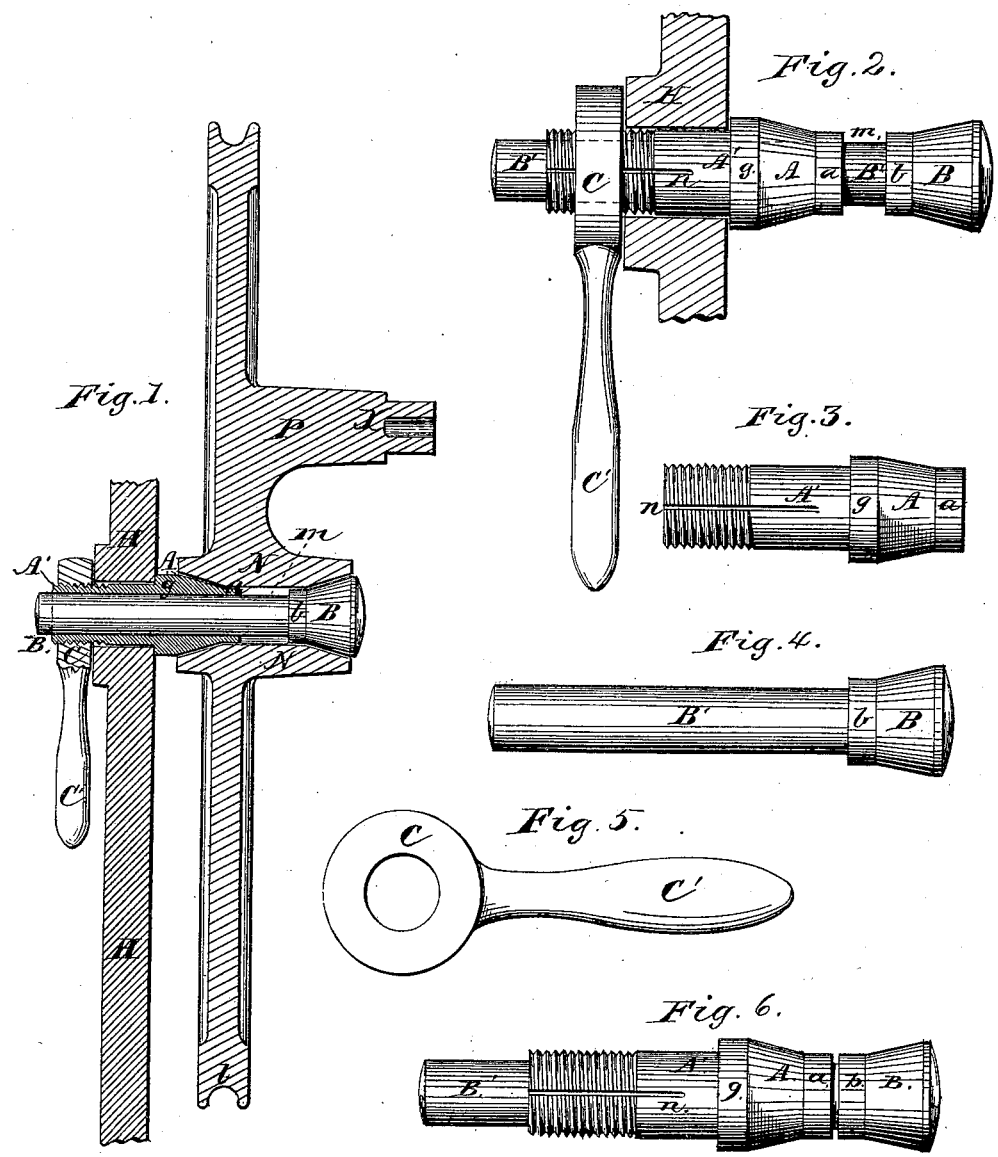
Witnesses
D. A. Kepner
George A. Boyer
Inventor
Theophilus Weaver

UNITED STATES PATENT OFFICE.

THEOPHILUS WEAVER, OF HARRISBURG, PENNSYLVANIA.

IMPROVEMENT IN JOURNALS AND COUPLINGS.

Specification forming part of Letters Patent No. 177,181, dated May 9, 1876; application filed March 20, 1876.

*To all whom it may concern:*

Be it known that I, THEOPHILUS WEAVER, of the city of Harrisburg, county of Dauphin and State of Pennsylvania, have invented certain Improvements in Journals and Couplings, of which the following is a full, clear, and exact description, sufficient to enable any one skilled in the arts to which it appertains to make and use the same, reference being had to the accompanying drawings, making a part of this specification, in which—

Figure 1 represents a transverse section of a band-wheel for sewing-machine and the machine-stand, and having my journal attached to both of said parts. Fig. 2 is a perspective view of my journal attached to a frame. Fig. 3 represents the stock or chuck of the journal. Fig. 4 represents the stem or journal proper. Fig. 5 represents a lever-nut. Fig. 6 represents the journal, coupled in position, as a short journal.

My invention relates specifically to sewing-machine journals; but it is by nature a universal composite journal or wrist, and may be employed as a shaft-coupling by modifying the stock to couple both ways. It is a new mechanical means, so far as it relates to the compressing-chuck, on which a common nut on a cleft tubular screw is employed, to compress the divisions of the screw forcibly, and thus clamping therein an interposed body, which may be instantly coupled or uncoupled by a partial turn of the nut. In the present example—viz, a journal-stud—the nut also serves the usual purpose as a fastening for the stud. My invention is, therefore, twofold, containing a new means, and a new article.

The means is a new mechanical movement in limited space, in which the effort of the thread in a nut, at the time of the impact, to climb over the thread of a corresponding screw, is translated by reaction to force the screw in upon itself, the screw being made resilient by making it hollow, and slotting its end where the nut is located, thus clamping an interposed body as in a vise.

The new article—journal or wrist—consists of, first, a hollow stock, with cleft screw-shank and conical bearing-shoulder; second, a stem or journal proper, made bolt form, with conical head and smooth body; third, a common wrench-nut.

The parts coupled by the journal or wrist are the frame or body on which the device is mounted, and the wheel, pitman, or other part, compensatingly and releasably attached.

The plans of construction of the parts of the journal are shown in Figs. 3 and 4, and their application to each other is shown in Fig. 6, and the application of the journal to the wheel and frame is shown in Fig. 1, and little explanation is needed.

The stock shown in Fig. 3 has the base $g$, the conical bearing A, and the cylindrical parts $a$ A′, and it is tubular, the bore therein corresponding with the stem B′ of the journal proper, which is fitted snugly therein, but not tightly. The shank A′ has one or more slots, $n$, therein, as shown.

The stem or journal-stud proper, as shown in Fig. 4, has the smooth stem B′, and the conical head B, and the cylindrical part $b$. The parts $a$ and $b$, of same diameter, are straight bearings, and act as supplements to the conical bearings A B, to resist the tendency of the conically-reamed hub N to climb from one conical bearing onto the other, and they are made short to cause little friction, and to leave a surplus space, $m$, between them as a reservoir for the lubricant. The stem B′ is left excessively long, so that the journal length may be adapted by adjustment to any of the varying sizes of hubs now extant on sewing-machines, in order that repairers need keep on hand only one or two sizes of journals, one size adapted for length, and the other for thickness of body, as no degree of uniformity is established between the different makes.

The operations of my journal are as follows: Insert the stem B′ in the stock A A′, through the wheel-hub N, as shown in Fig. 1, and tighten the nut C, which, at the instant of firm impact against the frame H or other body, acts to compress the sections of the shank A′, thus holding the stem B′ in the vise of the shank. A partial turn of the nut C is sufficient to couple or uncouple the parts.

My improved journal is specially adapted for use on band-wheels of sewing-machines; but it can be employed as a wrist-pin or compensating shackle-joint.

The advantages of my improved journal are briefly these: It is unmistakable in its operations, and therefore unskilled persons can adjust it; it is simple, and not liable to get out of working order; it is a compensative journal, effectually taking up lost motion; and it is differential or extensible to suit different styles of band-wheel hubs.

Having thus clearly and fully described my invention, what I regard as new and useful, and what I desire to secure by Letters Patent of the United States, is embraced in the following claims:

1. A journal or coupling, which employs in it a tubular stock, provided with a screw-threaded partially-slotted attaching-shank, and operating mediately by a common nut on said shank, to hold in clamped condition in said stock the smooth stem of a journal-bolt or other smooth body, substantially as set forth.

2. The journal proper B B', in combination with the partially-slotted journal-stock A A', by means of the nut C operating on the stem B' mediately as a slip-joint in the stock A A', and extensible for different lengths of wrists or wheel-hubs, substantially as set forth.

3. The journal proper B B', in combination with the partially-slotted stock A A', with the wheel-hub N, conically reamed out at its ends, and with the standard H, by means of the common lock-nut C operating as a cam or vise, both to attach the journal to said standard, and to hold it confined in said stock, substantially as and for the purposes set forth.

In testimony that I claim the foregoing as my invention, I have hereunto set my hand and seal in the presence of two witnesses, this 17th day of March, 1876.

THEOPHILUS WEAVER. [L. S.]

Attest:
   D. A. KEPNER,
   GEORGE A. BOYER.